US011061968B2

(12) United States Patent
Yoo et al.

(10) Patent No.: US 11,061,968 B2
(45) Date of Patent: Jul. 13, 2021

(54) METHOD, SYSTEM AND COMPUTER-READABLE RECORDING MEDIUM FOR RECOMMENDING QUERY WORD USING DOMAIN PROPERTY

(71) Applicant: NAVER Corporation, Seongnam-si (KR)

(72) Inventors: Jin-hwan Yoo, Seongnam-si (KR); Eric Eun, Seongnam-si (KR); Taeil Kim, Seongnam-si (KR); Jinah Jeong, Seongnam-si (KR); Tae Ho Lee, Seongnam-si (KR)

(73) Assignee: Naver Corporation, Seongnam-si (KR)

( * ) Notice: Subject to any disclaimer, the term of this patent is extended or adjusted under 35 U.S.C. 154(b) by 992 days.

(21) Appl. No.: 15/130,505

(22) Filed: Apr. 15, 2016

(65) Prior Publication Data

US 2016/0306898 A1 Oct. 20, 2016

(30) Foreign Application Priority Data

Apr. 16, 2015 (KR) .................. 10-2015-0053586

(51) Int. Cl.
G06F 16/9032 (2019.01)
(52) U.S. Cl.
CPC .............. *G06F 16/90328* (2019.01)
(58) Field of Classification Search
CPC ............................. G06F 16/90328
USPC ............................. 707/713, 767
See application file for complete search history.

(56) References Cited

U.S. PATENT DOCUMENTS

| 6,564,213 | B1* | 5/2003 | Ortega | G06F 16/3322 |
| 8,930,391 | B2* | 1/2015 | Chakrabarti | G01C 21/3611 |
| | | | | 707/765 |
| 2007/0050352 | A1* | 3/2007 | Kim | G06F 17/2223 |
| 2008/0294622 | A1* | 11/2008 | Kanigsberg | G06Q 30/02 |
| 2009/0094145 | A1* | 4/2009 | Kim | G06Q 30/02 |
| | | | | 705/34 |
| 2011/0004588 | A1* | 1/2011 | Leitersdorf | G06F 16/951 |
| | | | | 707/711 |
| 2012/0303664 | A1* | 11/2012 | Apacible | G06F 3/0482 |
| | | | | 707/780 |

(Continued)

FOREIGN PATENT DOCUMENTS

KR 10-0707725 4/2007

OTHER PUBLICATIONS

Bhatia et. al. "Query Suggestions in the absense of query logs". 2011. SIGIR '11 Proceedings of the 34th International ACM SIGIR conference on research and development in Information Retrieval. pp. 795-804 (Year: 2011).*

(Continued)

*Primary Examiner* — Michael Pham
(74) *Attorney, Agent, or Firm* — Greer, Burns & Crain, Ltd.

(57) ABSTRACT

A method of recommending a query word using a domain property includes receiving a search keyword from a terminal of a user, the search keyword being input by the user; generating at least one recommendation query word concerned with the search keyword by using a property of an object of a domain when the search keyword belongs to the object of the domain; and providing the recommendation query word to the terminal of the user as an autocomplete query word for the search keyword.

16 Claims, 11 Drawing Sheets

(56) References Cited

U.S. PATENT DOCUMENTS

| | | | | |
|---|---|---|---|---|
| 2013/0151533 A1* | 6/2013 | Udupa | ............... | G06F 16/3325 707/742 |
| 2014/0310255 A1* | 10/2014 | Cardell | ............... | G06F 16/5866 707/706 |
| 2014/0379745 A1* | 12/2014 | Zhu | ................... | G06F 16/3322 707/767 |
| 2015/0205828 A1* | 7/2015 | Manciero | ......... | G06F 16/90328 707/758 |
| 2015/0286708 A1* | 10/2015 | Tao | ...................... | G06F 16/334 707/730 |
| 2016/0041991 A1* | 2/2016 | Sahuguet | ........... | G06F 16/3322 707/706 |

OTHER PUBLICATIONS

Bhatia et. al. "Query Suggestions in the Absence of Query Logs". SIGIR '11: Proceedings of the 34th international ACM SIGIR conference on Research and development in Information RetrievalJul. 2011 pp. 795-804. https://doi.org/10.1145/2009916.2010023 (Year: 2011).*

M. T. Shaikh, M. S. Pera and Y. Ng, "A Probabilistic Query Suggestion Approach without Using Query Logs," 2013 IEEE 25th International Conference on Tools with Artificial Intelligence, Herndon, VA, 2013, pp. 633-639, doi: 10.1109/ICTAI.2013.99. (Year: 2013).*

\* cited by examiner

\<Recommendation query word based on query log\>

\<Car name + Property name\>

<Recommendation query word based on query log>

<Movie Title + Actor Name>

<Recommendation query word based on query log>

<Song Title + Singer Name>

(1)

METHOD, SYSTEM AND COMPUTER-READABLE RECORDING MEDIUM FOR RECOMMENDING QUERY WORD USING DOMAIN PROPERTY

CROSS-REFERENCE TO RELATED APPLICATIONS

A claim for priority under 35 U.S.C. § 119 is made to Korean Patent Application No. 10-2015-0053586 filed 16 Apr. 2015, in the Korean Intellectual Property Office, the entire contents of which are hereby incorporated by reference.

BACKGROUND

Embodiments of the inventive concept described herein relate to a technique for providing an autocomplete recommendation word for a search query word of a user.

In general, when a query word is input from a user to a search web site for providing a search service, the search website provides a website including a search result (such as a website including the query word, an article including the query word, or an image having a file name including the query word) to the user.

In recent years, the search service has been gradually improved to maximize user convenience and the main flow of the improvement direction is to provide a competent search result when a user inputs a query word.

Specifically, as search service users are increased, users having no sufficient knowledge about suitable query words are increased, so that there is a need to guide users to suitable queries.

Thus, a current search website recommends a search query suitable for a query input situation of a user to meet a user requirement.

As one example of a technique of providing an autocomplete recommendation word for a search query word of a user, there is disclosed a technique of recording a query log and proposing a recommendation query word suitable for a user input item and setting mode based on the query log in Korean Registered Patent No. 10-0707725 (registered on Apr. 9, 2007).

SUMMARY

Embodiments of the inventive concept provide a method and a system capable of suggesting a recommendation query word for a long tail query, for which query logs do not exist, by using a domain property.

Embodiments of the inventive concept provide a method and a system of presenting a recommendation query word while putting more emphasis on the recommendation query word than a search word input from a user.

Embodiments of the inventive concept provide a method and a system which is capable of recording a query log concerned with a domain property to utilize the query log as a reference of query word recommendation.

One aspect of embodiments of the inventive concept is directed to provide a method of recommending a query word which is implemented by a computer. The method includes receiving a search keyword from a terminal of a user, the search keyword being input by the user; generating at least one recommendation query word concerned with the search keyword by using a property of an object of a domain when the search keyword belongs to the object of the domain; and providing the recommendation query word to the terminal of the user as an autocomplete query word for the search keyword.

Another aspect of embodiments of the inventive concept is directed to provide a method of recommending a query word which is implemented by a computer. The method includes receiving a search keyword from a terminal of a user, the search keyword being input by the user; extracting at least one first recommendation query word concerned with the search keyword from a query log of the search keyword by using the query log; and generating at least one second recommendation query word concerned with the search keyword by using a property of an object of a domain when the search keyword belongs to the object of the domain; and providing at least one of the first and second recommendation query words to the terminal of the user as an autocomplete query word for the search keyword.

Still another aspect of embodiments of the inventive concept is directed to provide a method of recommending a query word which is implemented by a computer. The method includes transmitting a search key word when the search keyword input by a user is received from a terminal of the user; and receiving at least one recommendation query word concerned with the search keyword to display the recommendation query word on the terminal of the user as an autocomplete query word for the search keyword, wherein the recommendation query word includes a query word generated by combining an object and a property of a domain to which the search keyword belongs.

Still another aspect of embodiments of the inventive concept is directed to provide a system for recommending a query word, which includes a memory in which at least one program is loaded; and at least one processor, wherein the at least one program, when executed by the at least one processor, causes the at least one processor to perform receiving a search keyword from a terminal of a user, the search keyword being input by the user; generating at least one recommendation query word concerned with the search keyword by using a property of an object of a domain when the search keyword belongs to the object of the domain; and providing the recommendation query word to the terminal of the user as an autocomplete query word for the search keyword.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, an embodiment of the present invention will be described in detail with reference accompanying drawings.

An embodiment is related to a technique of recommending an autocomplete query word, and more particularly, to a method and a system of presenting a domain property as a recommendation query word for a long tail query to which autocomplete is not provided.

Figure 1:
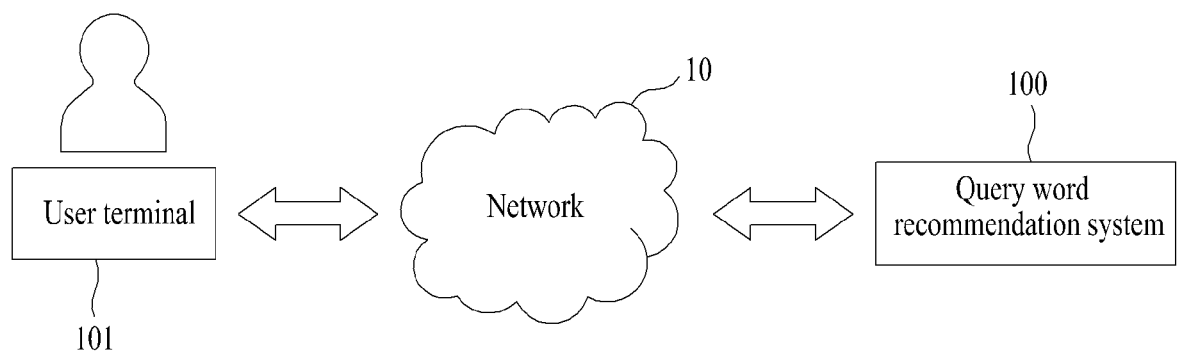
FIG. 1 is a view illustrating one example of an environment of providing a recommendation query word according to an embodiment.

FIG. 1 is a view illustrating one example of an environment for providing a recommendation query word according to an embodiment. FIG. 1 shows a user terminal 101 and a query word recommendation system 100. Arrows of FIG. 1 represent that data may be transmitted/received between elements through a wire/wireless network 10.

The user terminal 101 may execute at least one process configured to perform at least one feature described in the subject disclosure. The user terminal 101 may include all terminal devices accessible to a web/mobile site connected to the query word recommendation system 100 or capable of installing and executing a service dedicated application. In this case, the user terminal 101 may perform entire operations for a service, such as a service image construction, a data input, data transmission/reception, a data storage, etc., under control of a web/mobile site or a dedicated application For example, the user terminal may include, but not limited to, a personal computer (PC), a laptop computer, a smart phone, a tablet computer, a wearable computer, etc.

The user terminal 101 may be directly or indirectly coupled to the network 10 (such as the Internet or a local area network). For example, a personal computer and a laptop computer may be directly coupled to the network 10 through a wired network connection. The laptop computer may be wirelessly coupled to the network 10 through a wireless communication channel established between the laptop computer and a wireless access point (WAP). A smart phone may be wirelessly coupled to the network 10 through a wireless communication channel established between the smart phone and a cellular network/bridge. In this case, the network 10 may communicate with at least one secondary network (not shown) which includes, for example, a local area network, a wide area network, or an intranet, but the embodiment is not limited thereto.

The user terminal 101 may be interfaced with the query word recommendation system 100 through the network 10 described above.

The query word recommendation system 100 serves as a service platform for providing an autocomplete to the user terminal 101, which is a client. The query word recommendation system 100 may execute at least one process configured to perform at least one of the features described in the subject disclosure.

A user inputs a query word through the user terminal 101 accessible to a web server (for example, a search site) connected to the query word recommendation system 100. In this case, the web server receives the user input query word from a web browser of the user terminal 101 and transmits the user input query word to the query word recommendation system 100. In this case, the query word recommendation system 100 extracts an autocomplete query word corresponding to the user input query word and transmits the autocomplete query word to the web browser of the user terminal 101. Thus, the user terminal 101 may display the autocomplete query word received from the query word recommendation system 100 on the web browser thereof to make it convenient for the user to select a query word.

To this end, the query word recommendation system 100 stores the query log of the user in a query log database 251 (shown in FIG. 3) when the user searches for information, where the query log is indexed according to a phonemic symbol unit, a syllable unit or a suffix, and stored in the query log database 251. Thus, after extracting at least one autocomplete query word concerned with the user query word from the query log database 251, the query word recommendation system 100 provides the extracted autocomplete query word to the user terminal 101.

Specifically, in case that a query word, of which any corresponding query logs do not exist so that any autocomplete query words thereof cannot be provided, corresponds to a keyword of a specific domain, the query word recommendation system 100 may combine an object and a property concerned with the query word of a user with each other to generate a recommendation query word such that the recommendation query word is provided to the user terminal 101.

The query word recommendation system 100, which corresponds to a server computer, may include, for example, but not limited to, a server computing device, a personal computer, a server computer, a series of server computers, a mini-computer, and/or a main frame computer. The server computer may be a distributed computer system. In addition, operations of the server computer may be simultaneously or sequentially executed on at least one processor.

The query word recommendation system 100 may be implemented with a service platform concerned with a search service and one system, or a separated system, providing query word recommendations, so that the query word recommendation system 100 provides a function of recommending an autocomplete query word in connection with the search service.

The query word recommendation system 100 may be implemented on the user terminal 101 as an application, but the embodiment is not limited thereto. In addition, the query word recommendation system 100 may be implemented by being included in a service platform of providing a search service in a client-server environment.

Figure 2:
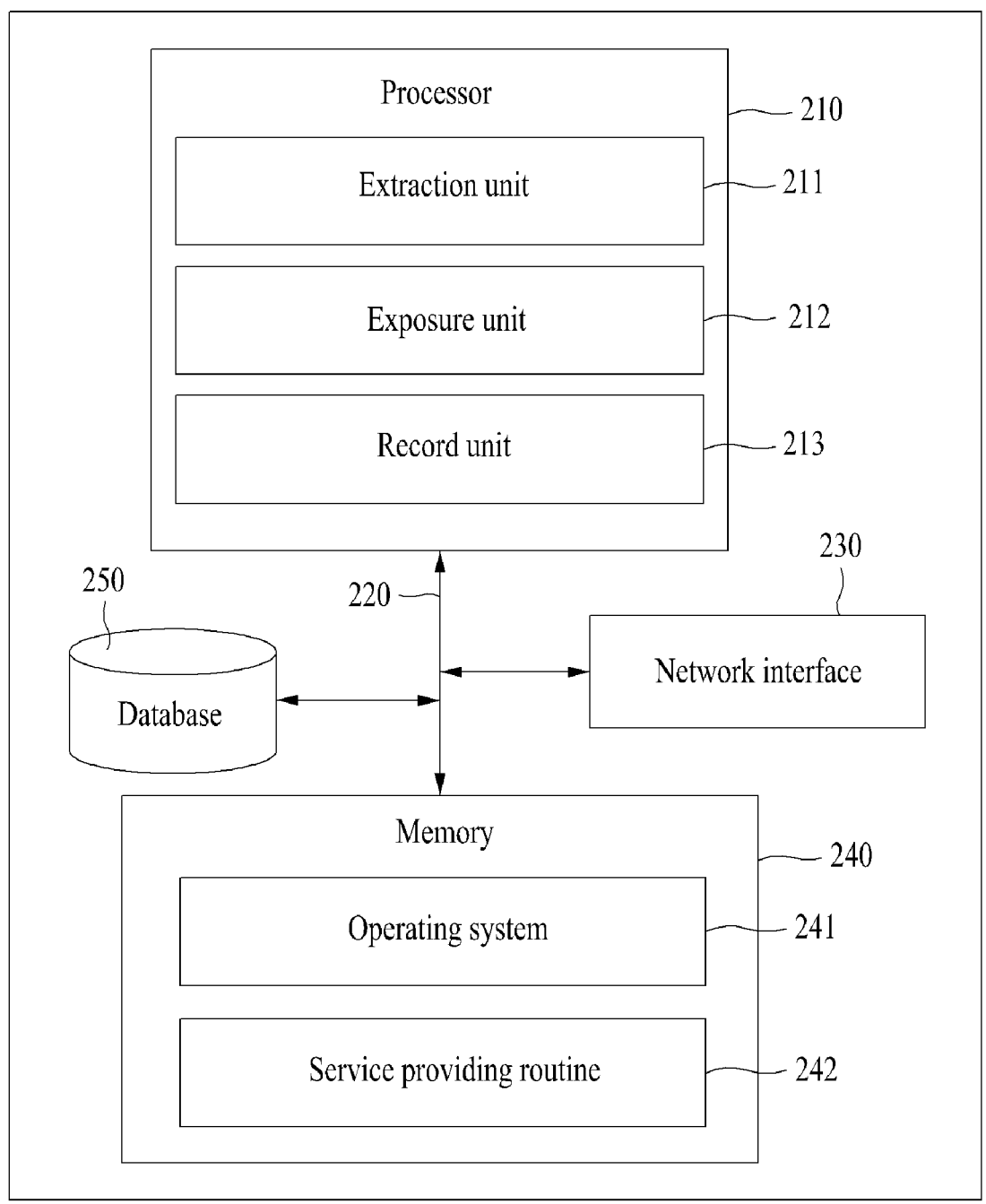
FIGS. 2 and 3 are block diagrams illustrating a query word recommendation system according to an embodiment.

FIG. 2 is a block diagram illustrating an internal configuration of a query word recommendation system 100 according to an embodiment.

As shown in FIG. 2, the query word recommendation system 100 according to an embodiment includes a processor 210, a bus 220, a network interface 230, a memory 240, and a database 250. The memory 240 may include an operating system (OS) 241 and a service providing routine 242. According to another embodiment, the query word recommendation system 100 may include more elements than those of FIG. 2.

The memory 240 which is a computer-readable recording medium may include a random access memory (RAM), a read only memory (ROM) and a permanent mass storage device such as a disc driver. In addition, the memory 240 may store program codes of the OS 241 and the service providing routine 242 therein. Such software elements may be loaded from a computer-readable recording medium separated from the memory 240 through a drive mechanism. The separated computer-readable recording medium may include a computer-readable recording medium such as a floppy drive, a disk, a tape, a DVD/CD-ROM drive, a memory card, etc. According to another embodiment, the software elements may be loaded from not the computer-readable recording medium but the network interface 230 to the memory 240.

The bus 220 enables the elements of the query word recommendation system 100 to communicate with each other and transmit data to each other therethrough. The bus 220 may be implemented by using a high-speed serial bus, a parallel bus, an SAN (Storage Area Network), or another suitable communication technique.

The network interface 230 may be a computer hardware element for connecting the query word recommendation system 100 to the network 10. The network interface 230 may connect the query word recommendation system 100 to the network 10 through a wire or wireless connection.

The processor 210 is configured to process instructions of a computer program by performing basic arithmetic, logic and an input/output operations of the query word recommendation system 100. The instructions may be provided to the processor 210 through the memory 240 or the network interface 230, and the bus 220. The processor 210 may be configured to execute program codes for an extraction unit 211, exposure unit 212 and record unit 213. The program codes may be stored in a recording device such as the memory 240.

Figure 3:
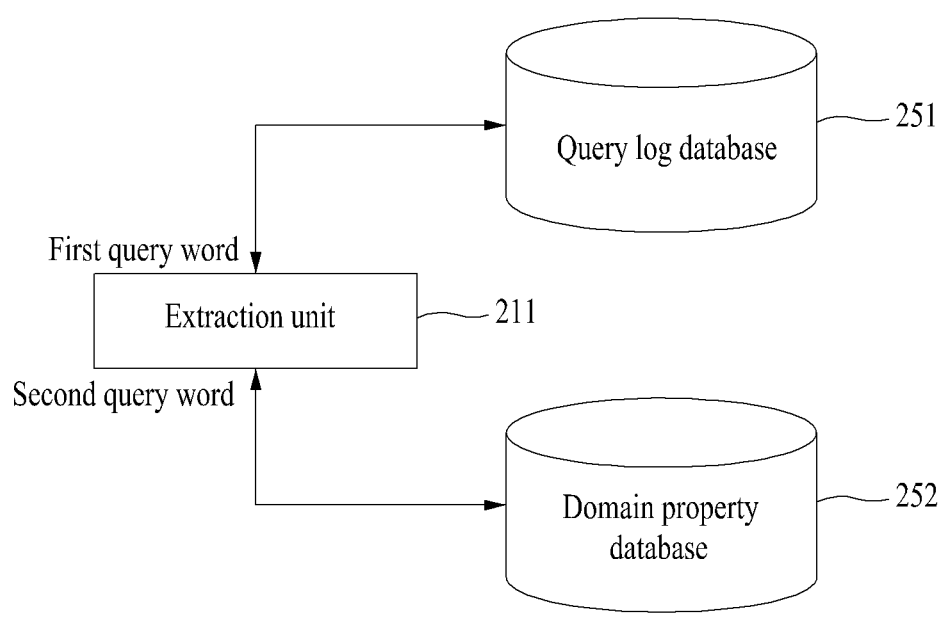

The data base 250 stores and maintains all information necessary for the query word recommendation. As shown in FIG. 3, the database 250 includes a query log database 251 and a domain property database 252.

The query log database 251 indexes the query log according to a phonemic symbol unit, a syllable unit or a suffix, and stores the query log according to the phonemic symbol unit index, the syllable unit index or the suffix index. The query log may be an entire query set input when users search for information in the search site provided by a web server and may include information about the searching frequency of each query word. For example, the searching frequency may be statistical information generated by analyzing how many times a specific query word is input for a predetermined time period.

The domain property database 152, which is a keyword database for storing and maintaining a previously registered keyword, stores information about the domain to which each keyword belongs and the property concerned with each keyword. In this case, the domain may mean, for example, a collection for classifying the information into a car, a web toon, movies, a singer, or a song, and the property information may include a kind or characteristics of information concerned with an individual object of a domain.

The extraction unit 211, which extracts the autocomplete query word corresponding to the query word input by a user from the database 250, may first extract at least one autocomplete query word (hereinafter, referred to as a 'first query word') concerned with the query word of the user from the query log database 251 constructed based on query logs. Specifically, when any query logs corresponding to the query word input by a user do not exist in the query word database 251, the extraction unit 211 may extract a keyword property concerned with the query word of the user from the domain property database 252 to generate an autocomplete query word (hereinafter, referred to as a 'second query word') based on the extracted keyword property.

Although the database 250 constructed and included in the query word recommendation system 100 is depicted in FIG. 2, it is possible to construct the database 250 as an external database constructed in another separated system.

Figure 4:
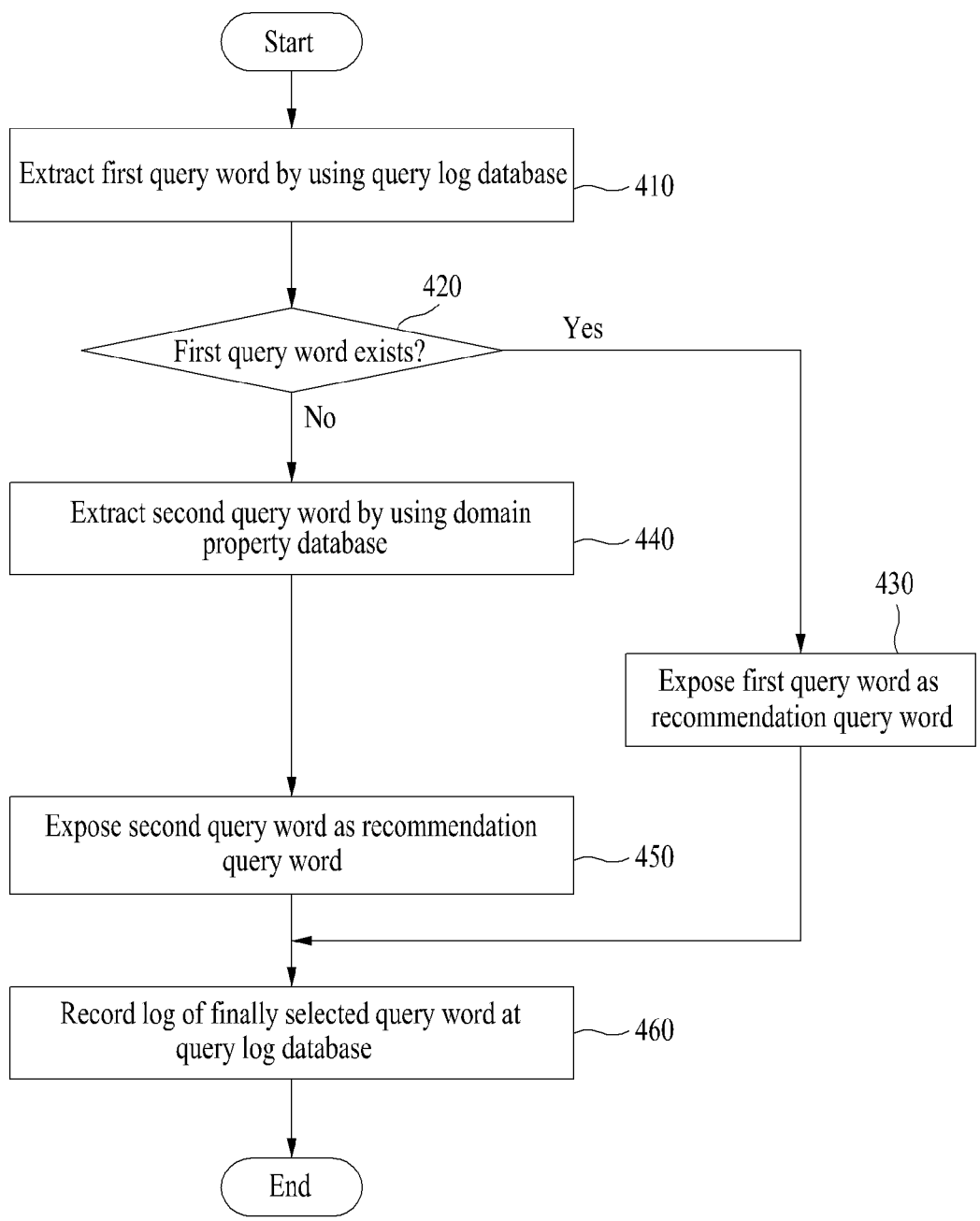
FIG. 4 is a flowchart illustrating a query word recommendation method according to an embodiment.

FIG. 4 is a flowchart illustrating a query word recommendation method according to an embodiment. According to the query word recommendation method of an embodiment, each step may be performed through the extraction unit 211, the exposure unit 212 and the record unit 213 described with reference to FIGS. 2 and 3.

In step 410, when the extraction unit 211 receives a query word (also referred to as a 'search keyword'), which is input by a user for the purpose of searching for information, from the user terminal 101, the extraction unit 211 may first extract a first query word from the query log database 251. The extraction unit 211 may extract in real time a first query word list concerned with the search keyword corresponding to the input situation of the search keyword based on the query log stored in the query log database 251. In this case, the first query word list may include at least one autocomplete recommendation word extracted from the query log database 251.

In step 420, after the extraction unit 211 determines whether at least one first query word exists as the result of extracting a query word from the query log database 251, based on this determination, the extraction unit 211 may determine whether a query word is further extracted. In this case, when at least one first query word is extracted from the query log database 251, the extraction unit 211 transfers the query word extraction result to the exposure unit 212.

In step 430, the exposure unit 212 exposes the at least one first query word extracted from the query log database 251 for the user search keyword as the autocomplete recommendation query word. That is, the exposure unit 212 may expose the recommendation query word list including the first query word for the user search keyword.

In step 440, when it is determined that the first query word does not exist as the result of the effort to extract a query word from the query log database 251, that is, the query log about the search keyword does not exist in the query log database 251, the extraction unit 211 extracts a second query word from the domain property database 252. Since the user search keyword does not exist in any query logs, when the extraction unit 211 fails to extract the first query word, the extraction unit 211 may extract a second query word by combining an object and a property with each other by utilizing a collection in the domain property database 252. For example, when a search keyword belongs to a specific domain (for example, a car domain, a web-toon domain, a movies domain, a singer domain, a song domain, etc.), the extraction unit 211 may extract at least one property concerned with the search keyword from the information stored in the domain property database as the second query word.

Examples of the combination of an object and a property of each domain are shown in following Table 1.

TABLE 1

| Domain | Object + Property |
|---|---|
| Car | name, year |
| comic | name, [days] |
| movie | title, [actor {cast, name} . . . ], [director] |
| singer | name, [memName], [groupName], [bestTrackName] |
| Song | title, artist |
| . . . | . . . |

Examples of information about a property of each domain are shown in Table 2.

TABLE 2

| Domain | Property |
|---|---|
| Car | Manufacturer, Car Model, Price, Fuel Consumption Rate, Fuel Efficiency, Engine Type, Fuel, . . . |

TABLE 2-continued

| Domain | Property |
|---|---|
| comic | Painter, Author, Content, Viewing, Genre, First Episode, . . . |
| movie | Director, Release Date, Running Time, Film Grade, Advance Ticket Ranking, Genre, Production Country, . . . |
| singer | Album, Song, New Song, Music Video, New Album, . . . |
| Song | Song Text, Music Video, Composer, . . . |
| . . . | . . . |

In other words, when the search keyword, for which query logs do not exist, belongs to a specific domain, the extraction unit 211 may combine the words registered as an individual object and property of the corresponding domain with each other to extract at least one second query word concerned with the search keyword. Examples of a search keyword and the second query word for the search keyword are shown in following Table 3.

TABLE 3

| Search keyword | Domain | Property | Second query word |
|---|---|---|---|
| Porsche Carrera gt pr | car | Price | Porsche Carrera GT Price |
| Porsche Carrera gt Fu | | Fuel efficiency | Porsche Carrera gt Fuel Efficiency |
| Porsche Carrera gt En | | Engine type | Porsche Carrera gt Engine type |
| Porsche Carrera gt Fu | | Fuel | Porsche Carrera gt Fuel |
| Porsche Carrera gt Dr | | Driving type | Porsche Carrera gt Driving type |
| . . . | | . . . | . . . |
| Gauss Electronics Vie | comic | View | Gauss Electronics View |
| Gauss Electronics Web | | Webtoon Content | Gauss Electronics Webtoon |
| Gauss Electronics Con | | . . . | Gauss Electronics Content |
| . . . | | | |
| I will visit you. Ac | movie | Actor Film | I will visit you. Actor |
| I will visit you. Tr | | Trailer | I will visit you. Trailer |
| I will visit you. Eva | | Evaluation Scores | I will visit you. Evaluation Scores |
| I will visit you. Sta | | Starring Actor | I will visit you. Starring Actor |
| I will visit you. Sup | | Supporting Actor | I will visit you. Supporting Actor |
| I will visit you. Rel | | Release Date | I will visit you. Release Date |
| . . . | . . . | . . . | . . . |
| . . . | | | |

In step 450, the exposure unit 212 exposes at least one second query word of the user search keyword extracted from the domain property database 252. That is, the exposure unit 212 may form the recommendation query word list of the user search keyword of the second query word and expose the recommendation query word list.

In step 460, when a finally input query word among search keywords or recommendation query words in order for the user to request an information search is received from the user terminal 101, the record unit 213 stores the log of the corresponding query word in the query log database 251. In this case, the record unit 213 may store the log of the query word selected as the final query word in the query log database 251 together with the frequency number of searches for the corresponding query word. As a query word previously not listed in query logs is selected as a final query word and is accumulated in the query log database 251, when the query word accords with a predetermined condition (for example, when the query word is used a predetermined number of times or more), the query word may be an object to be extracted as the first query word. In other words, the recommendation query word based on the domain property may be provided as an autocomplete recommendation query word based on a query log.

FIGS. 5 to 8 are views illustrating search images displayed on the user terminal 101 as a user interface related to a recommendation query word exposing process of the exposure unit 212.

Figure 5:
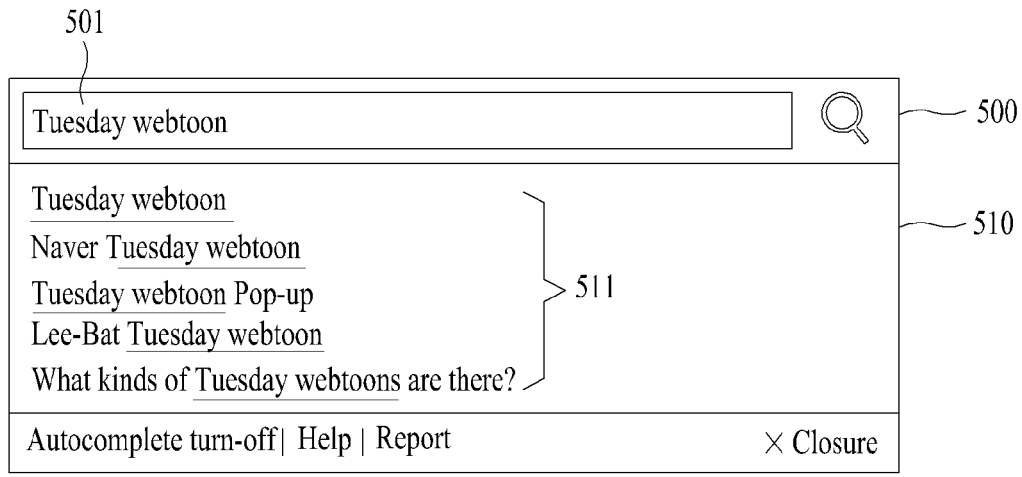
FIGS. 5 to 11 are views illustrating search images displayed on a user terminal as a user interface related to a recommendation query word exposing process according to an embodiment.

Referring to FIG. 5, the search image includes a search input window 500. When at least one first query word for the search keyword 501 input through the search input window 500 by a user is extracted from the query log database 251, a recommendation query word list 511 including the first query exposed through an autocomplete recommendation layer area 510 extending from the search word input window 500.

Figure 6:
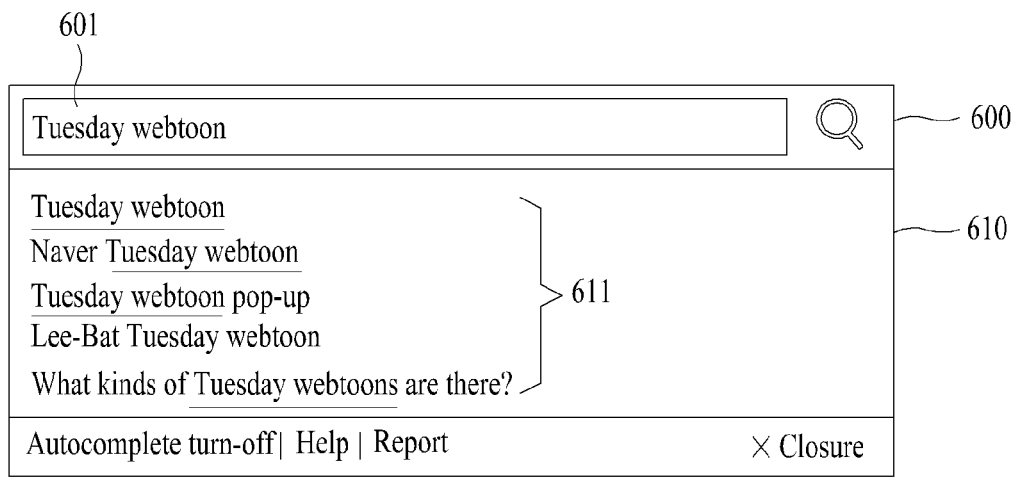
Figure 6:
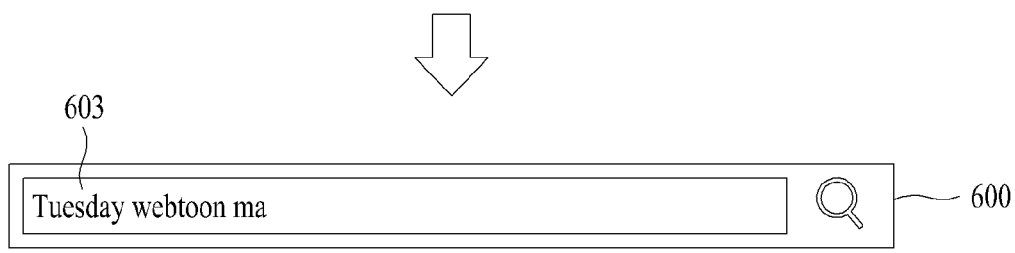

Referring to FIG. 6, as query words are sequentially input through the search input window 600, when a search keyword 603 having no corresponding query logs is input, since first query words for the search keyword 603 do not exist, an autocomplete recommendation layer area 610 including a recommendation query word list 611 for a previous search keyword 601 disappears and the search input window 600 switches to a state in which no results of recommending autocomplete query words exist.

Figure 7:
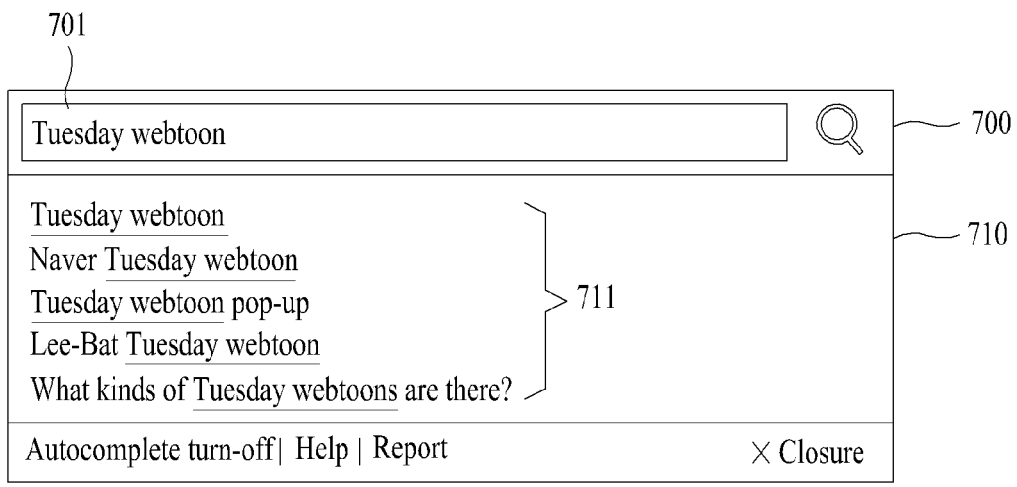
Figure 7:
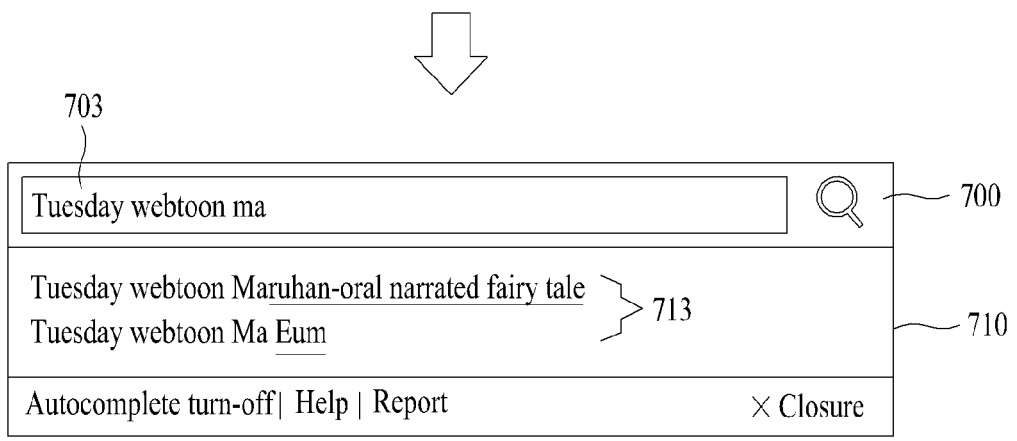

According to the embodiment, as shown in FIG. 7, as query words are sequentially input through the search input window 700, even though a search keyword 703 having no corresponding query logs is input, when at least one second query word is extracted from the domain property database 252, a recommendation query word list 713 including second recommendation query words are exposed on an autocomplete recommendation layer area 710. In other words, even though the input of the query word extends so that a query word 703 having no corresponding query logs is input while the recommendation query word list 711 including the first query word for the previous search keyword 701 is exposed, the recommendation query word list 713 including the second query word may be exposed.

Thus, the recommendation query word list including the first or second query word for a user input search keyword is exposed on the autocomplete recommendation layer area. In this case, to easily distinguish the autocomplete query words from each other, the recommendation query word lists including the first and second query words may be displayed in mutually different display manners.

Figure 8:
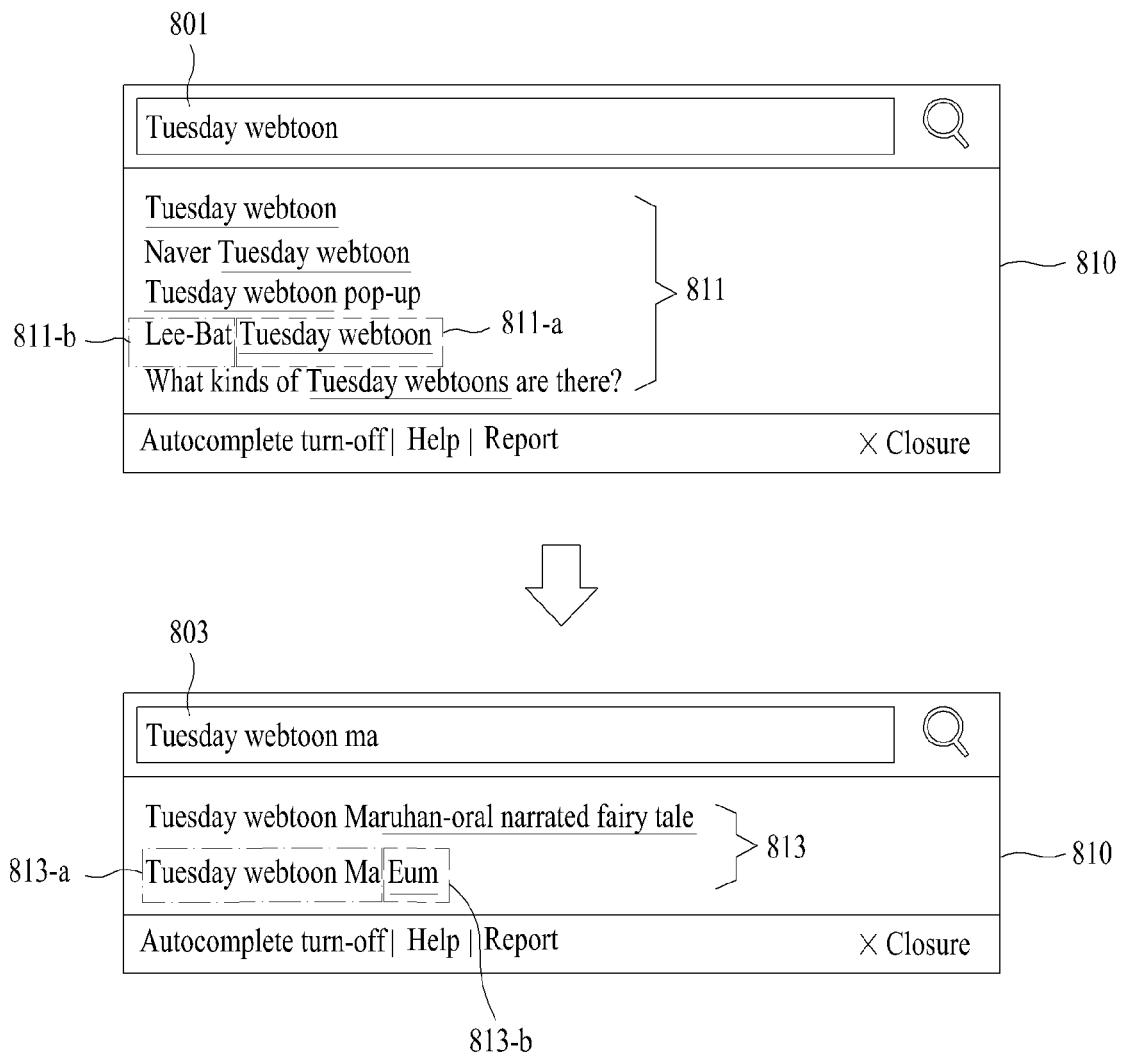

Referring to FIG. 8, when a recommendation query word list 811 including the first query word is exposed, a keyword part 811-*a* of each query word included in the corresponding list, which is identical to the search keyword 801 may be displayed to be emphasized more than the remaining part 811-*b* thereof. Differently, when a recommendation query word list 813 including the second query word is exposed, a recommendation keyword part 813-*b* of each query word included in the corresponding list may be displayed to be emphasized more than the keyword part 813-*a* identical to the search keyword 803. In this case, a scheme of emphasizing at least a part of the recommendation query word may be performed by using various display elements such as a thickness, a size, a color, a background color, an underline, an inclination of a text, etc.

When the autocomplete query word is recommended by using the second query word, a partially complete query word may be emphasized more than the search keyword input by a user, so that the recognition of the recommendation keyword part is improved.

As described above, although the first and second query words are distinguished from each other through mutually different emphasizing schemes while utilizing the common layer area, the embodiment is not limited thereto. For example, a scheme of distinguishing the first and second query words from each other by dividing the layer area into the areas for recommending the first and second query words, and a scheme of distinguishing the first and second query words from each other by making a background color of a layer, which is used when the first query word is used as the recommendation query word, different from that of a layer used when the second query word is used as the recommendation query word may be applied.

In addition, although it is described above that one of the first and second query words is selectively extracted and exposed as the autocomplete recommendation query word in accordance with whether the query log exists, the embodiment is not limited thereto. For example, after the first and second query words for a search keyword are simultaneously extracted, it is also possible to simultaneously expose the first and second query words as the autocomplete recommendation query words. In this case, the first and second query words may be distinguished to be distinguished from each other or without being distinguished from each other.

Figure 9:
Figure 9:
Figure 9:
Figure 10:
Figure 10:
Figure 10:
Figure 11:
Figure 11:
Figure 11:

FIGS. 9 to 11 are views illustrating examples of a recommendation query word suggested through the combination of an object and a property by utilizing a collection (domain for classifying information).

As shown in FIG. 9, when a query log for the keyword 'Volkswagen Golf En' exists, the query word 'Volkswagen Golf engine oil' extracted based on the query log may be exposed as a recommendation query word. Meanwhile, when any query logs for the keyword 'Volkswagen Golf En' do not exist and at least part of the search keyword corresponds to the object 'Car' of a specific domain, the query word 'Volkswagen Golf Engine Type' obtained by combining the object '(Car Name) Volkswagen Golf' and the property '(Property Name) Engine Type' of the specific domain with each other may be exposed as a recommendation query word.

As shown in FIG. 10, when a query log for the search keyword 'Amazing Spider-Man 2 Pro' exists, the query word 'Amazing Spider-Man 2 Provider' extracted based on the query log may be exposed as a recommendation query word. When query logs for the keyword 'Amazing Spider-Man 2 Jo' do not exist and at least part of the search keyword corresponds to the object 'Movies' of a specific domain, the query word 'Amazing Spider-Man 2 Jamie Fox' obtained by combining the object '(Movie Title) Amazing Spider-Man 2' and the property '(Actor Name) Jamie Fox' of the specific domain may be exposed with each other as a recommendation query word.

As shown in FIG. 11, when a query log of the search keyword ' Story of Last Night' exists, the query words 'Story of Last Night by Sobangcha', 'Story of Last Night', 'Story of Just Last Night' and 'Story of Last Night ii' extracted based on the query log may be exposed as recommendation query words. When query logs for the keyword 'Story of Last Night by So' do not exist and at least part of the search keyword corresponds to the object 'Song' of a specific domain, the query words 'Story of Last Night by Sobangcha' and 'Story of Last Night by Soya' obtained by combining the object '(Song Title) Story of Last Night' and the properties '(Singer Name) Soya' and '(Singer Name) Sobangcha' of the specific domain with each other may be exposed as recommendation query words.

Thus, according to the embodiment, a recommendation query word for a long tail query, for which autocomplete cannot be provided because corresponding query logs do not exist, may be suggested by using a domain property.

Some operations may be omitted or added from or to the above-described query word recommendation method based on the details described with reference to FIGS. 1 to 11. In addition, two or more operations may be combined with each other, and an order of operations or positions thereof may be changed.

The images shown in FIGS. 5 to 11 which are part of a search service are exemplary to help understanding of the inventive concept, but the embodiment is not limited thereto and an order or configuration of the images may be changed.

Figure 12:
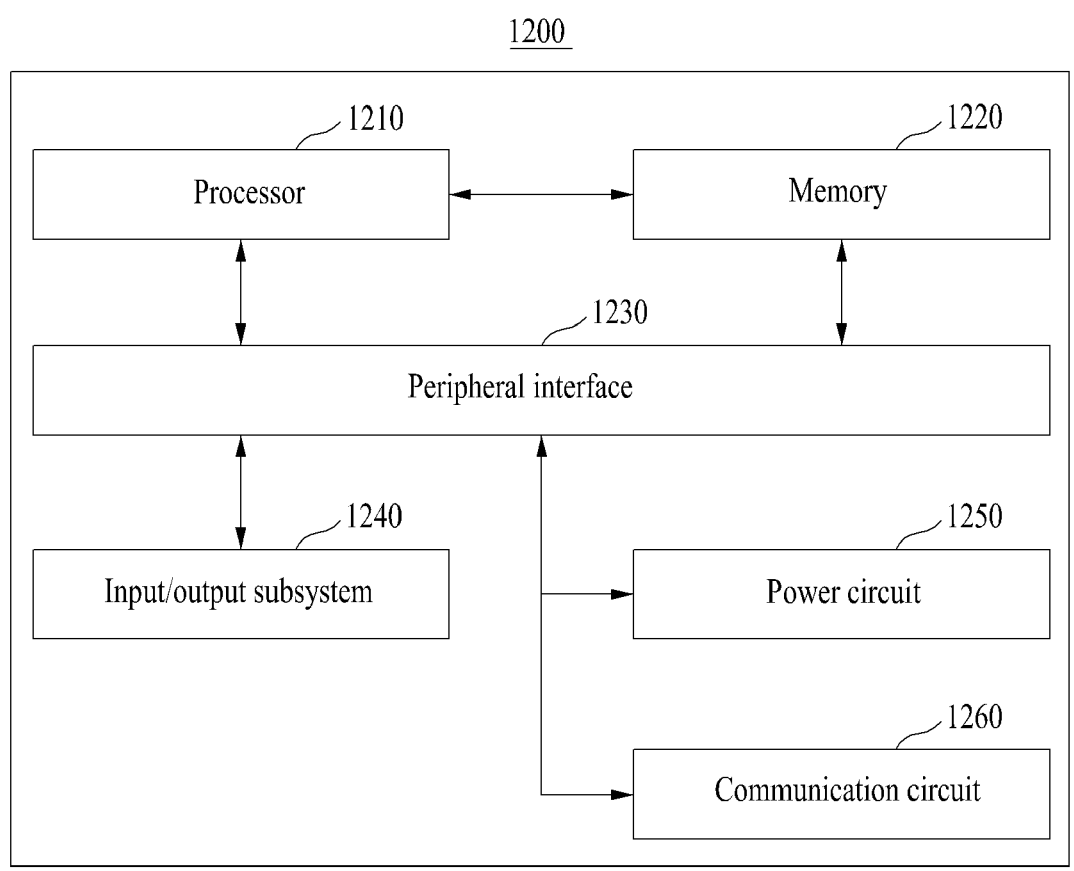
FIG. 12 is a block diagram illustrating an internal configuration of a computer system according to an embodiment.

FIG. 12 is a block diagram illustrating an internal configuration of a computer system according to an embodiment.

As shown in FIG. 12, a computer system 1200 may include at least one processor 1210, a memory 1220, a peripheral interface 1230, an input/output subsystem 1240, a power circuit 1250, and a communication circuit 1260. In this case, the computer system 1200 may correspond to the user terminal 101.

For example, the memory 1220 may include a high-speed random access memory (RAM), a magnetic disc, a static RAM, a dynamic RAM, a read only memory (ROM), a flash memory, or a nonvolatile memory. The memory 1220 may include a software module, a command set, or a variety of data necessary for an operation of the computer system 1200. The processor 1210 may control access to the memory 1220 from the processor 1210 or another component such as the peripheral interface 1230.

The peripheral interface 1230 may couple a peripheral input and/or output device of the computer system 1200 to the processor 1210 and the memory 1220. The processor 1210 may execute a software module or a command set stored in the memory 1220 to perform a variety of functions for the computer system 1200 and to process data.

The input/output subsystem 1240 may couple various peripheral input/output devices to the peripheral interface 1230. For example, the input/output subsystem 1240 may include a controller for coupling a monitor, a keyboard, a mouse, a printer, or a peripheral device such as a touch screen or a sensor to the peripheral interface 1230. According to another aspect, peripheral input/output devices may be coupled to the peripheral interface 1230 without passing through the input/output subsystem 1240.

All or a part of components of a terminal may be powered by the power circuit 1250. For example, the power circuit 1250 may include a power management system, at least one power source such as a battery or alternating current (AC), a charging system, a power failure detection circuit, a power converter or inverter, a power status indicator, or any other components for power generation, management, and distribution.

The communication circuit 1260 may communicate with another computer system by using at least one external port. As described above, if necessary, the communication circuit 1260 may include an RF circuit and may communicate with another computer system by transmitting and receiving an RF signal known as an electromagnetic signal.

The computer system 1200 illustrated in FIG. 12 may be exemplary. The computer system 1200 may not include some of components shown in FIG. 12, may further include an additional component not shown in FIG. 12, or may be configured or disposed such that two or more components are coupled to each other. For example, the computer system of a communication terminal in a mobile environment may further include a touch screen, a sensor, and the like as well as components shown in FIG. 12, and the communication circuit 1260 may include circuits for RF communication in various communication schemes such as Wi-Fi, 3G, LTE, Bluetooth, near field communication (NFC), Zigbee, and the like. Components capable of being included in the computer system 1100 may be implemented with hardware including an integrated circuit specialized for at least one signal processing or application, software, or a combination thereof.

Methods according to an embodiment of the inventive concept may be implemented in the form of program instruction executable through various computer systems and may be recorded on a computer-readable recording medium. In particular, a program according to an embodiment of the inventive concept may be a PC-based program or an application dedicated to a mobile terminal. An application applicable to an embodiment may be installed into a user terminal through a file provided from a file distribution system. For example, the file distribution system may include a file transfer unit (not shown) which transfers the file in response to the request of a user terminal.

As described above, according to the embodiment, a recommendation query word for a user input query word, for which autocomplete cannot be provided because corresponding query logs do not exist, may be suggested by using a domain property, so that a user easily completes a desired query word to be induced to obtain a suitable search result. In addition, according to the embodiment, the recommendation query word generated based on the domain property may be emphasized more than the search keyword input by a user, so that the recognition of the recommendation query word is improved, thereby allowing the user to conveniently select the recommendation query word. In addition, according to the present invention, a query log may be recorded in accordance with the domain property thereof to be utilized as a query word recommendation reference, so that the recommendation query word generated based on the domain property is provided as the autocomplete recommendation query word based on the query log, thereby providing a cycle of query word recommendation.

The methods according to embodiments may be implemented in the form of program instruction executable through various computer systems and may be recorded on a computer-readable recording medium.

In particular, a program according to an exemplary embodiment of the inventive concept may be a PC-based program or an application dedicated to a mobile terminal. An app related to the function of recommending an autocomplete query word according to an embodiment may be implemented in the form of an independently operating program or may be configured in an in-app of a specific application (for example, a search service app) executable in the specific application.

In addition, the methods according to embodiments may be performed by allowing an application concerned with the query word recommendation system 100 to control a user terminal. For example, such an application may execute at least one process which is configured to perform at least one of features described in the disclosure. In addition, the application may be installed on a user terminal through a file which a file distribution system provides. For example, the file distribution system may include a file transfer unit (not shown) which transfers the file in response to a request of a user terminal.

The units (or devices) described herein may be implemented using hardware components, software components, and/or a combination thereof. For example, devices and components described therein may be implemented using a processor, a controller, an arithmetic logic unit (ALU), a digital signal processor, a microcomputer, a field programmable gate array (FPGA), a programmable logic unit, a microprocessor or any other device capable of responding to and executing instructions in a defined manner. A processing device may run an operating system (OS) and one or more software applications that run on the OS. The processing device also may access, store, manipulate, process, and create data in response to execution of the software. For the sake of easy understanding, an embodiment of the inventive concept is exemplified as one processing device is used; however, one skilled in the art will appreciate that a processing device may include multiple processing elements and multiple types of processing elements. For example, a processing device may include multiple processors or a processor and a controller. In addition, other processing configurations are possible, such as parallel processors.

The software may include a computer program, a piece of code, instructions, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to embodiments may be implemented in the form of program instructions executable through various computing devices and may be recorded in a computer-readable medium. The computer-readable medium may also include program instructions, data files, data structures, and the like independently or in the form of combination. The program instructions recorded in the medium may be those specially designed and constructed for the embodiment or may be well-known and available to those skilled in the computer software arts. Examples of the computer-readable medium may include magnetic media such as hard disks, floppy disks, and magnetic tape; optical media such as CD ROM disks and DVD; magneto-optical media such as floptical disks; and hardware devices that are specialized to store and perform program instructions, such as read-only memory (ROM), random access memory (RAM), flash memory, and the like. Examples of program instructions may include both machine code produced by a compiler and high-level code executed by the computer using an interpreter. The described hardware devices may be configured to operate as one or more software modules to perform the operations of the above-described embodiments, and vice versa.

Although being described with reference to specific examples and drawings, modifications, additions and substitutions on embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to the embodiment, a recommendation query word for a query word, for which autocomplete cannot be provided because query logs for the query word do not exist, may be suggested by using a domain property, so that a user easily completes a desired query word to be induced to obtain a suitable search result.

According to the embodiment, the recommendation query word generated based on the domain property may be emphasized more than the search keyword input by a user, so that the recognition of the recommendation query word is improved, thereby allowing the user to conveniently select the query word.

According to the embodiment, a query log may be recorded in accordance with the domain property thereof to be utilized as a query word recommendation reference, so that the recommendation query word generated based on the domain property is provided as the autocomplete recommendation query word based on the query log, thereby providing a cycle of query word recommendation.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method of recommending a query word, the method being implemented by a computer and comprising:
   receiving a search keyword from a terminal of a user, the search keyword being input by the user;
   determining that a query log for the search keyword does not exist by comparing the search keyword against an indexed query log database;
   when it has been determined that the query log for the search keyword does not exist, generating at least one recommendation query word concerned with the search keyword by using, from a domain property database, a property of an object of a domain when the search keyword belongs to the object of the domain, wherein the domain property database comprises a keyword database for classifying, storing, and maintaining previously registered keywords into a plurality of domains; and
   providing the at least one recommendation query word to the terminal of the user as an autocomplete query word for the search keyword, wherein the at least one recommendation query word comprises a property of the domain to which the search keyword belongs.

2. The method of claim 1, wherein the at least one recommendation query word is generated by combining the object and the property of the domain to which the search keyword belongs.

3. The method of claim 1, further comprising,
   when it has been determined that the query log for the search keyword does exist, extracting at least one other recommendation query word concerned with the search keyword from the indexed query log database.

4. The method of claim 1, further comprising recording the query log of the at least one recommendation query word when a search request using the at least one recommendation query word occurs.

5. A method of recommending a query word, the method being implemented by a computer and comprising:
   receiving a search keyword from a terminal of a user, the search keyword being input by the user;
   determining that a query log for the search keyword does not exist by comparing the search keyword against an indexed query log database;
   when it has been determined that the query log for the search keyword does not exist, extracting at least one first recommendation query word concerned with the search keyword from a domain property database for the search keyword by using a property of an object of a domain to which the search keyword belongs, wherein the domain property database comprises a keyword database for classifying, storing, and maintaining previously registered keywords into a plurality of domains; and
   generating at least one second recommendation query word concerned with the search keyword from the domain property database for the search keyword by using the property of the object of the domain to which the search keyword belongs; and
   providing at least one of the first and second recommendation query words to the terminal of the user as an autocomplete query word for the search keyword, wherein the at least one recommendation query word comprises a property of the domain to which the search keyword belongs.

6. A method of recommending a query word, the method being implemented by a computer and comprising:
   transmitting a search key word when the search keyword input by a user is received from a terminal of the user;
   determining that a query log for the search keyword does not exist by comparing the search keyword against an indexed query log database;
   when it has been determined that the query log for the search keyword does not exist, receiving at least one recommendation query word concerned with the search keyword to display the at least one recommendation query word on the terminal of the user as an autocomplete query word for the search keyword,
   wherein the least one recommendation query word comprises a query word generated by combining an object and a property of a domain from a domain property database to which the search keyword belongs and wherein the at least one recommendation query word comprises a property of the domain to which the search keyword belongs, and
   wherein the domain property database comprises a keyword database for classifying, storing, and maintaining previously registered keywords into a plurality of domains.

7. The method of claim 6, wherein the at least one recommendation query word comprises a first keyword part which is a part of the at least one recommendation query word identical to the search keyword and a second keyword part which is a remaining part of the at least one recommendation query word except for the first keyword part, and the first and second keyword parts are displayed to be distinguished from each other.

8. The method of claim 6, wherein the at least one recommendation query word comprises a first keyword part which is a part of the at least one recommendation query word identical to the search keyword and a second keyword part which is a remaining part of the at least one recommendation query word except for the first keyword part, the first and second keyword parts are displayed to be distinguished from each other, and the second keyword part is emphasized more than the first keyword part.

9. The method of claim 6, wherein when it has been determined that the query log for the search keyword does not exist, the at least one recommendation query word comprises another query word extracted from the query log for the search keyword, the another query word comprises a first keyword part which is a part of the another query word identical to the search keyword and a second keyword part which is a remaining part of the another query word except for the first keyword part, and the first keyword part is displayed to be emphasized more than the second keyword part.

10. A non-transitory computer-readable recording medium recorded with instructions, the instructions, which are executed by a computer system, causing the computer system to provide an autocomplete query word by using a method comprising:

receiving a search keyword from a terminal of a user, the search keyword being input by the user;

determining that a query log for the search keyword does not exist by comparing the search keyword against an indexed query log database;

when it has been determined that the query log for the search keyword does not exist, generating at least one recommendation query word concerned with the search keyword by using, from a domain property database, a property of an object of a domain when the search keyword belongs to the object of the domain, wherein the domain property database comprises a keyword database for classifying, storing, and maintaining previously registered keywords into a plurality of domains; and providing the at least one recommendation query word to the terminal of the user as an autocomplete query word for the search keyword and wherein the at least one recommendation query word comprises a property of the domain to which the search keyword belongs.

11. A system of recommending a query word, the system comprising:

a memory in which at least one program is loaded; and at least one processor, wherein the at least one program, when executed by the at least one processor, causes the at least one processor to perform:

receiving a search keyword from a terminal of a user, the search keyword being input by the user;

determining that a query log for the search keyword does not exist by comparing the search keyword against an indexed query log database;

when it has been determined that the query log for the search keyword does not exist, generating at least one recommendation query word concerned with the search keyword by using, from a domain property database, a property of an object of a domain when the search keyword belongs to the object of the domain, wherein the domain property database comprises a keyword database for classifying, storing, and maintaining previously registered keywords into a plurality of domains; and providing the at least one recommendation query word to the terminal of the user as an autocomplete query word for the search keyword and wherein the at least one recommendation query word comprises a property of the domain to which the search keyword belongs.

12. The system of claim 11, wherein the at least one recommendation query word is generated by combining the object and the property of the domain to which the search keyword belongs.

13. The system of claim 11, wherein, in accordance with the program, the processor further performs: determining that the query log does exist and extracting at least one other recommendation query word concerned with the search keyword from the indexed query log database when the query log of the search keyword exists.

14. The system of claim 11, wherein, in accordance with the program, the processor further performs recording the query log of the at least one recommendation query word when a search request using the at least one recommendation query word occurs.

15. The system of claim 11, wherein the at least one recommendation query word comprises a first keyword part which is a part of the at least one recommendation query word identical to the search keyword and a second keyword part which is a remaining part of the at least one recommendation query word except for the first keyword part, and the first and second keyword parts are displayed on the terminal of the user to be distinguished from each other.

16. The system of claim 15, wherein the first and second keyword parts are displayed such that the second keyword part is emphasized more than the first keyword part.

* * * * *